US010270251B1

(12) United States Patent
Neely et al.

(10) Patent No.: US 10,270,251 B1
(45) Date of Patent: Apr. 23, 2019

(54) EMULATOR APPARATUS FOR MICROGRID TESTING AND DESIGN

(71) Applicant: National Technology & Engineering Solutions of Sandia, LLC, Albuquerque, NM (US)

(72) Inventors: Jason C. Neely, Albuquerque, NM (US); Steven F. Glover, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1074 days.

(21) Appl. No.: 13/659,822

(22) Filed: Oct. 24, 2012

(51) Int. Cl.
 *H02J 3/00* (2006.01)
 *H02J 3/38* (2006.01)

(52) U.S. Cl.
 CPC ........... *H02J 3/38* (2013.01); *H02J 2003/007* (2013.01)

(58) Field of Classification Search
 None
 See application file for complete search history.

(56) References Cited

U.S. PATENT DOCUMENTS

| 7,078,445 | B2 | 7/2006 | Xu et al. |
| 7,117,044 | B2 | 10/2006 | Kocher et al. |
| 7,557,464 | B2 | 7/2009 | Wang et al. |
| 7,983,799 | B2 | 7/2011 | Bose et al. |
| 8,067,855 | B2 | 11/2011 | Mumtaz et al. |
| 8,164,217 | B1 | 4/2012 | Miller |
| 8,768,675 | B2 * | 7/2014 | Bracker .................. G05F 1/625 703/13 |
| 2004/0124812 | A1 * | 7/2004 | Delmerico ................ H02J 3/24 322/29 |
| 2009/0326724 | A1 * | 12/2009 | Lasseter .................. H02J 3/382 700/287 |
| 2010/0265747 | A1 * | 10/2010 | Egiziano ................... G05F 1/67 363/132 |
| 2012/0044722 | A1 * | 2/2012 | Cuk ....................... H02M 3/335 363/21.03 |
| 2012/0119586 | A1 | 5/2012 | Carralero et al. |
| 2012/0191440 | A1 * | 7/2012 | Meagher ................... H02J 3/38 703/18 |
| 2012/0259477 | A1 * | 10/2012 | Abido ....................... H02J 3/38 700/297 |

(Continued)

OTHER PUBLICATIONS

Abdullah, Nayeem Mohammad, "Development of distributed generation infrastructure for microgrid connectivity to operational power systems" (2010). FIU Electronic Theses and Dissertations. Paper 1099. 156 pages.*

(Continued)

*Primary Examiner* — Omar F Fernandez Rivas
*Assistant Examiner* — Robert S Brock
(74) *Attorney, Agent, or Firm* — Daniel J. Jenkins

(57) ABSTRACT

An emulator apparatus that emulates entities included in a microgrid is described herein. The emulator apparatus emulates a load with time-varying inductance/resistance or an energy storage device or combination of energy storage devices. The emulator apparatus is electrically coupled to a system or device that is desirably tested/maintained/designed. The emulator apparatus emulates a particular device, and response of the system of device to the emulated device is monitored for purposes of design, testing, or maintenance.

8 Claims, 11 Drawing Sheets

(56) References Cited

U.S. PATENT DOCUMENTS

| | | | | |
|---|---|---|---|---|
| 2013/0241585 | A1* | 9/2013 | Inzunza Figueroa | G01R 31/42 324/750.01 |
| 2017/0370993 | A1* | 12/2017 | Weinberg | H02P 11/00 |
| 2018/0123497 | A1* | 5/2018 | Holthaus | G01R 31/42 |

OTHER PUBLICATIONS

Authors Unknown, True, Reactive, and Apparent Power, 4 pages, obtained from http://www.allaboutcircuits.com/textbook/alternati ng-currenVchpt-11/true-reactive-and-apparent-power/ on Apr. 30, 2016.*

Binduhewa et al, Standard Microsource Interface for a Microgrid, Cired Seminar 2008: SmartGrids for Distribution, Frankfurt, Jun. 23-24, 2008, 4 pages.*

M. Elshaer, A. Mohamed and O. Mohammed, "Grid connected DC distribution system for efficient integration of sustainable energy sources," Power Systems Conference and Exposition (PSCE), 2011 IEEE/PES, Phoenix, AZ, 2011, pp. 1-9.*

Glover et al, Secure Scalable Microgrid Test Bed at Sandia National Laboratories, Proceedings of the 2012 IEEE International Conference on Cyber Technology in Automation, Control and Intelligent Systems May 27-31, 2012, Bangkok, Thailand, pp. 23-27.*

J. W. Kolar and T. Friedli, "The essence of three-phase PFC rectifier systems," 2011 IEEE 33rd International Telecommunications Energy Conference (INTELEC), Amsterdam, Oct. 9-13, 2011, pp. 1-27.*

N. Mendis, K. M. Muttaqi, S. Perera and M. N. Uddin, "A novel control strategy for stand-alone operation of a wind dominated RAPS system," Industry Applications Society Annual Meeting (IAS), 2011 IEEE, Orlando, FL, 2011, pp. 1-8.*

A. Mohamed, M. Elshaer and O. Mohammed, "Bi-directional AC-DC/DC-AC converter for power sharing of hybrid AC/DC systems," 2011 IEEE Power and Energy Society General Meeting, San Diego, CA, pp. 1-8 (Jul. 2011).*

O. A. Mohammed, M. A. Nayeem and A. K. Kaviani, "A laboratory based microgrid and distributed generation infrastructure for studying connectivity issues to operational power systems," IEEE PES General Meeting, Minneapolis, MN, 2010, pp. 1-6.*

Primavera et al, One-cycle controlled three-phase electronic load, IET Power Electron., 2012, vol. 5, Iss. 6, pp. 827-832, Jul. 2012.*

V. Salehi, A. Mohamed, A. Mazloomzadeh and O. A. Mohammed, "Laboratory-Based Smart Power System, Part I: Design and System Development," in IEEE Transactions on Smart Grid, vol. 3, No. 3, pp. 1394-1404, Jun. 2012.*

Haimin Tao, Integration of sustainable energy sources through power electronic converters in small distributed electricity generation systems, Dissertation, Technische Universiteit Eindhoven, 2008, 315 pages.*

O. Wasynczuk et al., "Voltage and frequency regulation strategies in isolated AC micro-grids," Cyber Technology in Automation, Control, and Intelligent Systems (CYBER), 2012 IEEE International Conference on, Bangkok, 2012, pp. 5-10.*

Zhihong Ye, Modeling and Control of Parallel Three-Phase PWM Converters, Dissertation, Virginia Polytechnic Institute and State University, 2000, 182 pages.*

Wikipedia Contributors, "AC power," Wikipedia, The Free Encyclopedia, as archived on Oct. 5, 2011, https://en.wikipedia.org/w/index.php?title=AC_power&oldid=454090849 (accessed Sep. 5, 2017), 5 pages.*

Terlip, Daniel V. "A Methodology for Characterizing and Modeling Inverters for Grid Integration Studies using Power Hardware-in-the-Loop." PhD diss., University of Colorado at Boulder, Nov. 2011. 135 pages (Year: 2011).*

\* cited by examiner

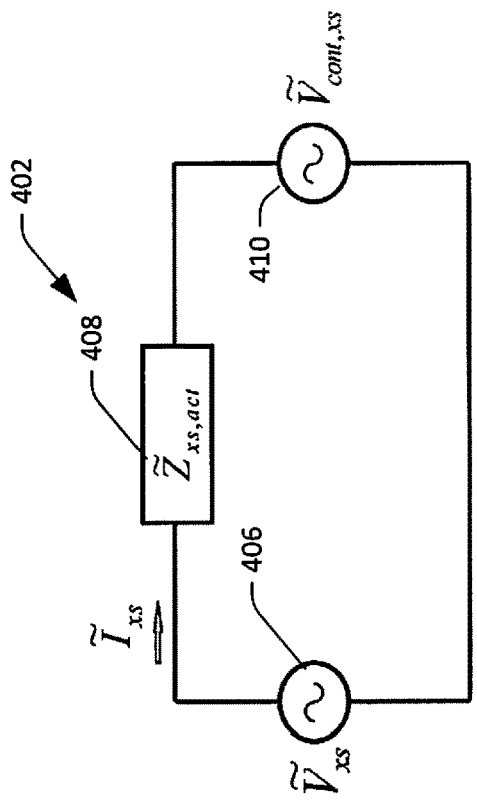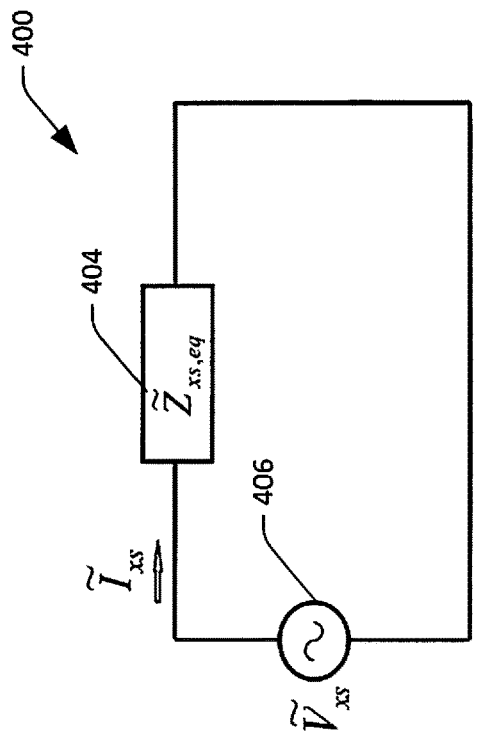
FIG. 4

EMULATOR APPARATUS FOR MICROGRID TESTING AND DESIGN

STATEMENT OF GOVERNMENTAL INTEREST

This invention was developed under Contract DE AC04-94AL85000 between Sandia Corporation and the U.S. Department of Energy. The U.S. Government has certain rights in this invention.

BACKGROUND

Relatively recently, there has been a push to rethink how electric power is provided to consumers. Conventionally, relatively large power plants burn fossil fuels to provide electric power to consumers. These power plants are typically controlled by private entities that bill consumers as a function of an amount of power utilized by the consumers over some time period. In the conventional power grid, suppliers provide a seemingly infinite amount of energy to consumers such that consumers can vary their demands for electric power and the supplier meets the varying demands. Thus, consumers can simply request power (by turning on and off devices, by running air-conditioning units, etc.) and the supplier ensures that the requested power is available to the consumer. Of growing concern, with respect to these types of power systems, is the waste of nonrenewable resources consumed by the power plants when producing electric power, as well as pollution generated by such power plants.

In an attempt to reduce carbon emissions and other pollutants caused by these conventional power systems, power systems that employ renewable energy to generate electric power have been manufactured and deployed. These types of power systems include, but are not limited to, wind turbine farms, hydro turbines, solar panel fields, geothermal power systems, and the like. While these systems offer a promising alternative to the conventional power grid, there are various deficiencies associated therewith. First, such types of systems generally output variable amounts of power over time (depending upon sunlight, cloud cover, wind, and the like), rendering it difficult to meet regulation requirements and changing demands of consumers.

To overcome at least some of the deficiencies set forth above, microgrids have been theorized wherein a microgrid comprises at least one independently owned electric power source that is configured to provide electric power to at least one consumer in an area that is local to the electric power source. Pursuant to an example, a homeowner can attach photovoltaic cells to the rooftop of her home. Additionally, the homeowner may have a storage device (a capacitor bank, a series of batteries, etc.) that is configured to capture electric power generated by the photovoltaic cells that is not consumed by the homeowner at the time that the electric power is generated, thereby retaining this as stored energy in the storage device and allowing this stored energy to be later recovered as electrical power when desired. Currently, designing a microgrid is an inexact science, often with a designer of the microgrid having to guess as to the equipment that will be needed to provide a suitable amount of power to a home, a building, a military base, or other regions served by power sources of the microgrid.

SUMMARY

The following is a brief summary of subject matter that is described in greater detail herein. This summary is not intended to be limiting as to the scope of the claims.

Described herein are various technologies pertaining to an emulator apparatus that is coupled to a microgrid and configured to facilitate design, testing, and maintenance of the microgrid. A microgrid, as the term is used herein, comprises at least one independently owned/operated variable source of electric power, an energy bus that receives energy generated by the variable source, and a variable load that consumes energy from the voltage bus. Further, the microgrid is either disconnected from, or disconnectable from, the conventional electric grid, such that the microgrid can operate independently from the conventional electric grid. Accordingly, the microgrid also comprises power electronics and control systems that facilitate balancing voltage on the bus, thereby assuring that loads in the microgrid receive requested energy, storage devices are properly operated to consume surplus energy and discharge energy when the variable source outputs deficient energy, etc. Pursuant to an example, the energy bus can be a DC voltage bus. In another exemplary embodiment, the energy bus can be an AC voltage bus.

In an exemplary embodiment, an emulator apparatus described herein is configured to emulate one of a plurality of selectable energy storage devices or some combination of selectable energy storage devices. Exemplary energy storage devices include, but are not limited to, a battery or set of batteries, a capacitor bank, a flywheel, or other suitable device that can both discharge energy to the bus of the microgrid and consume energy from the bus of the microgrid. In such an exemplary emulator apparatus, the bus of the microgrid can be a DC voltage bus. The emulator apparatus comprises emulator circuitry that can be controlled to model a plurality of respective energy storage devices. The emulator apparatus further comprises control systems that are employed to control the emulator circuitry. Such control systems (and emulator circuitry) can take into consideration both physical limitations of the respective storage devices (such as storage capacity and discharge rate), dynamic system considerations such as the response of reactive or mechanical components, as well as control system-imposed limitations for such respective devices, such as slew-rate limitations. Pursuant to an example, a flywheel may be emulated by modeling its mechanical dynamics (e.g., rotation of flywheel, frictional losses, . . . ), its electrical dynamics (generator flux, inductor and transformer currents, etc.) as well as the behaviors of its speed and voltage feedback controls to generate a reference characteristic for it electrical output. The dynamic models for several devices may be modeled simultaneously; therefore, the emulator apparatus can emulate operation of an energy storage device or combination of energy storage devices when electrically connected to the microgrid. Each of such devices can be referred to herein as energy storage devices With more specificity pertaining to the emulator circuitry (that maintains the reference characteristic), such circuitry can comprise or be coupled to a voltage source that is employed by the emulator apparatus to emulate a discharging state of an energy storage device. The emulator circuitry can further comprise a dump circuit that is employed by the emulator apparatus to emulate a charging stage of an energy storage device. Accordingly, for example, the emulator apparatus can receive a signal from the microgrid indicating that the apparatus is to discharge energy to the energy bus. Responsive to receiving such signal, the emulator apparatus can cause the voltage source to discharge energy to the bus as if it were the energy storage device being emulated by the emulator apparatus. Likewise, the microgrid can transmit a signal to the emulator apparatus indicating that the energy storage device (emulated by the emulator apparatus) desirably consumes energy from the bus, and thus desirably enters a charging stage. Responsive to receiving such a signal, the emulator apparatus can retrieve energy from the bus and dump such energy by way of the dump circuit, thereby emulating energy storage. The emulator apparatus can comprise a plurality of switches that are commanded by a respective control system to emulate a selected energy storage device or combination thereof.

In another exemplary embodiment, an emulator apparatus can be configured to emulate a load of the microgrid with time-varying resistance and inductance. In such an exemplary embodiment, the bus of the microgrid can be an alternating current (AC) voltage bus. Accordingly, the emulator apparatus acts as a programmable load, where both resistance and inductance can be altered over time. In such an embodiment, the apparatus comprises emulator circuitry, wherein the emulator circuitry includes an inverter, and wherein three legs of the inverter each have a relatively nominal resistance and inductance. The emulator circuitry further comprises a DC link coupled to an output leg of the inverter, wherein the DC link has a relatively high capacitance. The DC link is coupled to a dump circuit, which is employed in connection with dumping excess energy. Switches of the inverter are selectively controlled by a control system to manipulate phases of voltages on the input legs of the inverter, which can effectively cause resistance and inductance of varying levels to be emulated. Accordingly, the emulator apparatus can be provided with a time-varying inductance/resistance profile, and the emulator apparatus can emulate step-changes in inductance and resistance. The microgrid can be monitored to ascertain its response to such time-varying resistance/inductance.

Other aspects will be appreciated upon reading and understanding the attached figures and description.

BRIEF DESCRIPTION OF THE DRAWINGS

FIG. 4 illustrates exemplary schematic diagrams of respective circuits that appear to have equivalent inductances.

DETAILED DESCRIPTION

Figure 1:
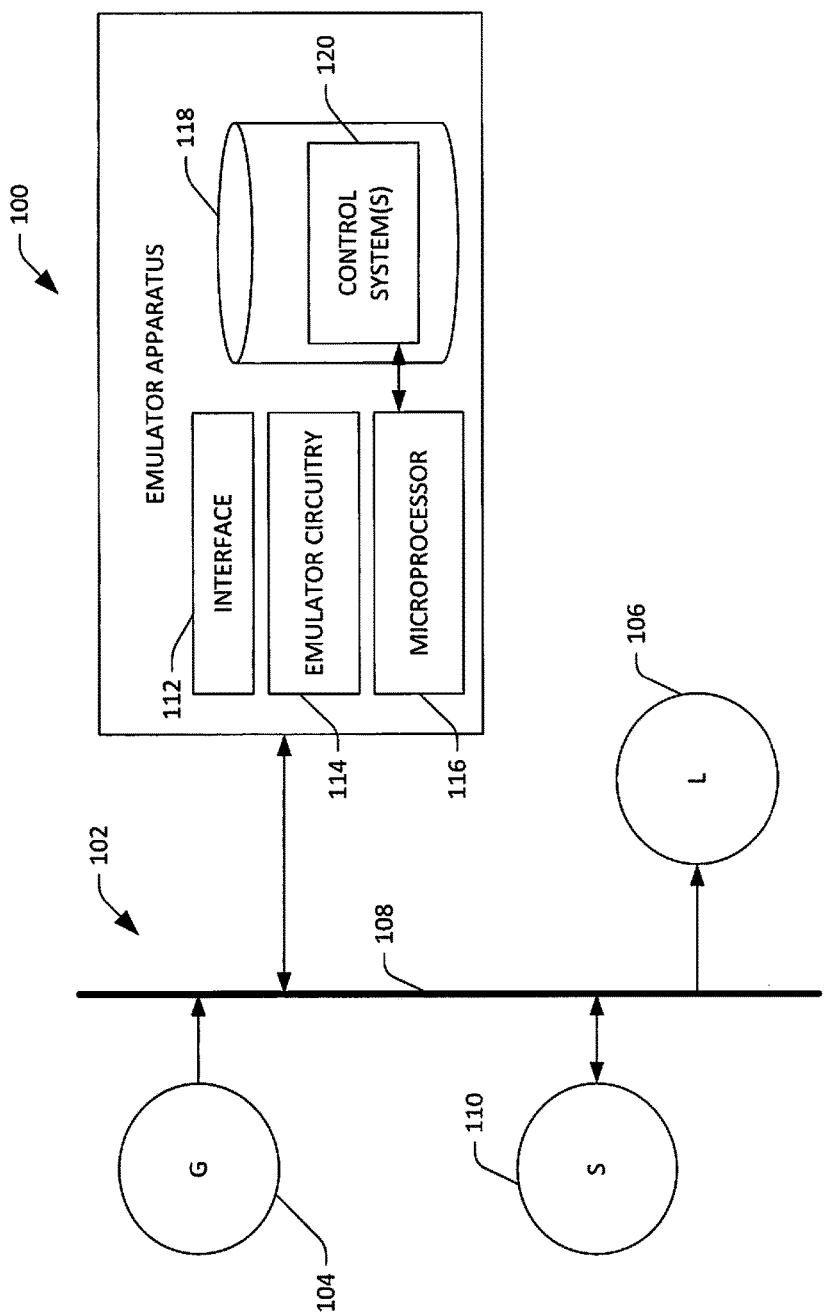
FIG. 1 is a functional block diagram of an emulator apparatus that can emulate devices connected to a microgrid.

Various technologies pertaining to emulating an energy storage device, combination of energy storage devices, and time-varying resistance/inductance of a load in a microgrid will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary emulator apparatus 100 that can be electrically coupled to an energy bus of a microgrid 102 is illustrated. As will be described below, the emulator apparatus 100 can be configured to emulate at least one entity that is coupled electrically to the microgrid 102. The microgrid 102 comprises a source of electric power 104 that generates electric power. Pursuant to an example, the source of electric power 104 can be a variable source of electric power, such as a photovoltaic power system, a wind turbine, a geothermal power system, a concentrated solar tower, pumped hydro, or the like. In another exemplary embodiment, the source of electric power 104 may be a fossil fuel burning source of electric power, such as a generator.

The microgrid 102 further comprises a variable load 106 that consumes electric power generated by the source of electric power 104. The variable load 106, for example, can represent the collective demands for electric power of a region included in the microgrid 102. In an exemplary embodiment, the variable load 106 can represent electric power demands of a house or neighborhood. In another example, the variable load 106 can represent demands for electric power of a military base, a cell phone tower, or the like, where demands for electric power vary over time.

The microgrid 102 additionally comprises an energy bus 108, wherein the variable load 106 is electrically connected to the energy bus 108 and extracts electric energy therefrom. In an exemplary embodiment, the source of electric power 104 is electrically connected to the energy bus 108 such that the source of electric power 104 charges the energy bus 108. The variable load 106 then draws power from the energy bus 108.

It can be ascertained that if the source of electric power 104 is a variable source of electric power, such variable source of electric power may not be able to meet changing demands of the variable load 106. For example, if the source of electric power 104 is a photovoltaic power generation system, then such photovoltaic power generation system may not meet the demands for electric power of the variable load 106 at night. In another example, if the source of electric power 104 is a fossil fuel burning source of electric power, such source is not configured to vary an amount of electric power output with high efficiency. Accordingly, in such an example, the source of electric power 104 efficiently outputs a steady amount of electric power which is known to meet the changing demands of the variable load 106. This, however, can result in the waste of relatively valuable resources, as more fossil fuel may be burned than necessary to meet the demands of the variable load 106.

Thus, the microgrid 102 can optionally include an energy storage device 110 that can supplement both the source of electric power 104 and the variable load 106, depending upon an amount of electric power generated by the source of electric power 104 and the demands for electric power of the variable load 106. For example, when an amount of electric power generated by the source of electric power 104 exceeds the demands for electric power of the variable load 106, the energy storage device 110 can supplement the variable load 106 by consuming excess energy (and storing such energy). When the amount of electric power demanded by the variable load 106 exceeds an amount of electric power generated by the source of electric power 104, the energy storage device 110 can supplement the source of electric power 104 by discharging energy onto the energy bus 108 for consumption by the variable load 106.

In an exemplary embodiment, the energy storage device 110 can be electrically connected to the energy bus 108 such that the energy storage device 110 consumes excess power generated by the source of electric power 104 and discharges energy when demanded by the variable load 106. In another exemplary embodiment, the energy storage device 110 can be directly connected to the source of electric power 104 (which charges the energy storage device 110) and the electric energy storage device 110 can, in turn, meet demands for electric power of the variable load 106. In such an embodiment, the source of electric power 104 may not be electrically connected to the energy bus 108.

The energy storage device 110 can be any suitable device (or collection of devices) that can both consume and discharge energy. Accordingly, the energy storage device 110 can be a battery, a collection of batteries, a capacitor, a capacitor bank, a flywheel, or the like.

While not shown, it is to be understood that the microgrid 102 further comprises other power electronics and control systems that facilitate controlling operation of the source of electric power 104, consumption of electric power by the variable load 106, and the consumption and/or discharge of energy from the energy storage device 110. Such control systems ensure that, for example, demands of the variable load 106 are met by causing energy retained in the energy storage device 110 to be discharged and made available on the energy bus 108 if the source of electric power 104 is providing an insufficient amount of power to meet the demands of the variable load 106. Furthermore, control systems of the microgrid 102 ensure that the microgrid 102 remains stable.

The emulator apparatus 100 can be electrically connected to the energy bus 108 of the microgrid 102. As mentioned above, the emulator apparatus 100 is configured to emulate a microgrid entity. Pursuant to an example, the emulator apparatus 100 can emulate, for instance, a variable load. For instance, the emulator apparatus 100 can emulate a load with both time-varying resistance and time-varying inductance. In such an embodiment, the energy bus 108 can be an AC bus. In another exemplary embodiment, the emulator apparatus 100 can emulate a particular energy storage device or combination of energy storage devices. Accordingly, an exemplary application of the emulator apparatus 100 is to connect such apparatus 100 to the energy bus 108 of the microgrid 102 for purposes of designing the microgrid 102, testing the microgrid 102, and/or maintaining the microgrid 102. For instance, a designer of the microgrid 102 may wish to ascertain how the control systems of the microgrid 102 respond to a load with relatively high variances in inductance and/or resistance. Rather than manually coupling inductors and resistances of different inductances and resistances, respectively, to the energy bus 108 of the microgrid 102, the designer of the microgrid 102 can couple the emulator apparatus 100 to the energy bus 108 and cause the emulator apparatus 100 to emulate a load with varying inductances and resistances. In another exemplary embodiment, if it is desirable to ascertain how a particular energy storage device will affect performance of the microgrid 108, rather than being forced to acquire such energy storage device, the designer of the microgrid 102 can electrically connect the emulator apparatus 100 to the energy bus 108 of the microgrid 102 and cause the emulator apparatus 100 to emulate the energy storage device (or combination of devices) of interest.

The emulator apparatus 100 comprises an interface 112 that is configured to receive, for example, user or programmatic instructions pertaining to the entity desirably being emulated by the emulator apparatus 100. Therefore, the interface 112 can be or include mechanisms that received tactile input from a user, such as a keyboard, a touch-sensitive display, rotating dials, mechanical sliders, etc. Likewise, the interface 112 can include a camera or microphone that receives voice commands or gestures from the user. In another exemplary embodiment, the interface 112 can be employed to receive programmatic instructions. Therefore, the interface 112 can be a disk drive, a port that facilitates receipt of instructions embodied in a computer readable medium, such as a flash drive, a wireless antenna that receives instructions by way of a wireless communication signal, or other suitable interface.

The emulator apparatus 100 further comprises emulator circuitry 114 that can be configured to emulate an entity in accordance with instructions received by way of the interface 112. The emulator apparatus 100 additionally comprises a microprocessor 116, which can also be referred to as a microcontroller. The emulator apparatus 100 further includes a data repository 118 that comprises instructions that are executed by the microprocessor 116. Specifically, the data repository 118 comprises control system(s) 120 that are configured to selectively control the emulator circuitry 114 to cause the emulator circuitry 114 to emulate the microgrid entity in accordance with instructions received by way of the interface 112. Additionally, while not shown, the emulator apparatus 100 can comprise at least one sensor that senses a condition corresponding to the emulator apparatus and transmits a signal received by the microprocessor 116 responsive to sensing such condition. The microprocessor 116 can transmit control signals to switches in the emulator circuitry 114 in accordance with the control system(s) 120 and signals received from the at least one sensor, causing the emulator circuitry 114 to emulate the entity in accordance with instructions received by way of the interface 112. Exemplary emulator circuitry 114 as well as exemplary control logic are set forth below for different embodiments of the emulator apparatus 100.

In an exemplary embodiment, the emulator apparatus 100 can be configured to emulate an energy storage device that is coupled to the energy bus 108 of the microgrid 102. The emulator apparatus 100 can be configured to emulate a suitable energy storage device or combination of selected energy storage devices, such as, but not limited to, a battery, a series of batteries, a capacitor, a capacitor bank, a super capacitor, a flywheel, or any suitable combination thereof. Different energy storage devices have different operating characteristics associated therewith, including responses, charge/discharge rate, storage capacities, etc. At least some of such operating characteristics are limited by physical properties of a respective energy storage device, while other operating characteristics can be limited/controlled by control systems that control operation of the respective energy storage device. For instance, a battery without a management system, when shorted, can provide a relatively large current in less than 100 ms. The management system that controls operation of the battery, however, may restrict the slew rate of the battery. To emulate an energy storage device, then, the emulator circuitry 114 can be selected and configured to potentially model operation of a wide array of energy storage devices, including those with relatively fast responses, relatively slow responses, etc. The control system(s) 120 can be configured to control the emulator circuitry 114 to emulate operation of such devices. The emulator apparatus 100 can be connected to the energy bus 108 of the microgrid 102, and performance of the microgrid 102 can be analyzed given that the emulator apparatus 100 is emulating a particular energy storage device.

In another exemplary embodiment, the emulator apparatus 100 can emulate a load with time-varying inductance and resistance. When monitoring operation of the conventional electric grid, the load thereon is assumed to be constant, due to the large number of loads connected to the grid. In the microgrid 102, however, as the microgrid 102 serves a much smaller number of loads, variance in load must be accounted for when designing/monitoring the control system for the microgrid 102. For instance, if the microgrid 102 is configured to serve an individual home, turning on an appliance that consumes a relatively large amount of power, such as an air-conditioning unit, can cause a step change in both resistance and inductance that must be accounted for by the control system of the microgrid 102. The emulator apparatus 100 can effectively emulate such a step-change in both resistance and inductance, and can be programmable. In such an embodiment, the interface 112 can receive programmatic instructions that include, for example, step changes in resistance and/or inductance. Pursuant to a particular example, the interface 112 can receive a resistance/inductance profile that defines a time-series of resistance/inductance values. The control system(s) 120 can cause the emulator circuitry 114 to emulate the step changes in resistance and/or inductance that are defined in the program received by the interface 112.

Figure 2:
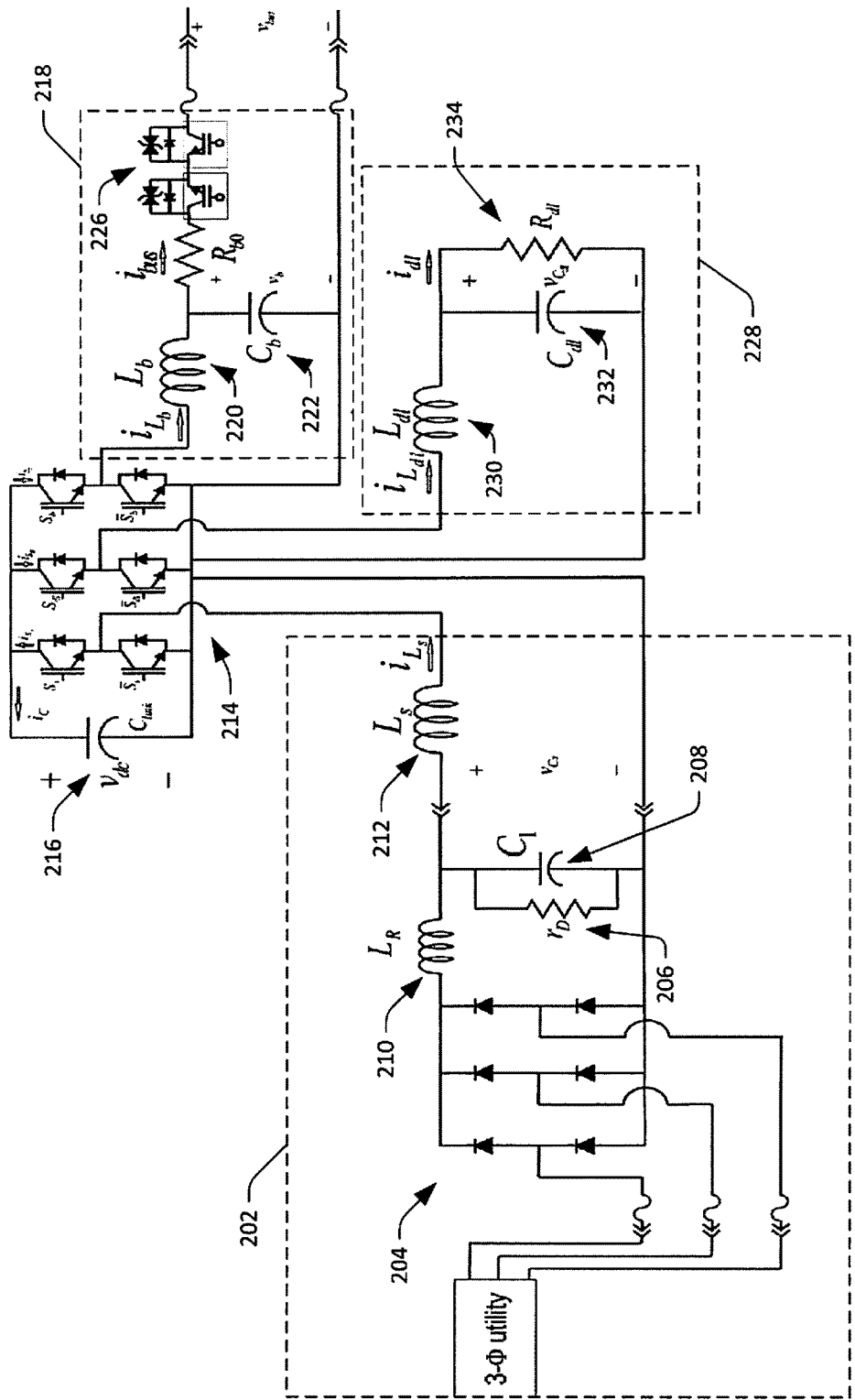
FIG. 2 is an exemplary schematic diagram of emulator circuitry that can be included in the emulator apparatus of FIG. 1.

With reference now to FIG. 2, a schematic diagram of an exemplary implementation of the emulator circuitry 114 when the emulator apparatus 100 is configured to emulate a selected energy storage device or combination of energy storage devices is illustrated. The emulator circuitry 114, in the exemplary embodiment shown in FIG. 2, is coupled to a power source 202, which is shown as comprising a plurality of diodes 204, a resistor 206 with resistance $r_D$, a capacitor 208 with capacitance $C_1$, a first inductor 210 with inductance $L_R$, and a second inductor 212 with inductance $L_S$. Voltage across the capacitor 208 is $v_{Cs}$, and current through the second inductor 112 is shown as being $i_{L_S}$. The power source 202 is electrically connected to an inverter 214 that comprises a plurality of switches labeled as $S_s$, $\bar{S}_s$, $S_{dl}$, $\bar{S}_{dl}$, $S_b$, and $\bar{S}_b$, respectively. The power source 202 can be any suitable power source, including the AC grid, a commercial DC power supply, or the like. Currents corresponding to said switches are denoted as $i_{L_s}$, $i_{L_{dl}}$, and $i_{L_b}$, respectively. Such switches can receive control signals from the microprocessor 116, for example. A DC link capacitor 216 with capacitance of $C_{link}$ is electrically connected to the inverter 214, wherein voltage across the capacitor is $v_{dc}$ and current into the capacitor 216 is $i_C$. Pursuant to an example, the DC link capacitor 216 can have a capacitance between 2500 µF and 4000 µF.

The emulator circuitry 114 additionally comprises an output filter 218, which is coupled to a leg of the inverter 214. The output filter 218 includes an inductor 220 with an inductance of $L_b$, wherein current through the inductor is shown as being $i_{L_b}$. The output filter 218 further comprises a capacitor 222 with a capacitance of $C_b$ and voltage thereover denoted as $v_b$. The output filter 218 also includes a resistor 224 with resistance $R_{b0}$, wherein a current of $i_{bus}$ travels through such resistor 224. Moreover, the output filter 218 comprises a set of switches 226 that are configured to enable or disable the flow of current to the emulator circuitry 114 from a DC bus (with voltage $v_{bus}$) of the microgrid or from the emulator circuitry 114 to the DC bus of the microgrid.

The emulator circuitry 114 further comprises a dump load 228, wherein the dump load comprises an inductor 230 with inductance $L_{dl}$ coupled to a leg of the inverter 214. Current through the inductor is denoted as $i_{L_{dl}}$. The dump load 228 further comprises a capacitor 232 and a resistor 234 that are electrically connected in parallel with one another, and such parallel connection is connected in series to the inductor 230. The capacitor 232 has a capacitance of $C_{dl}$ and a voltage thereover of $v_{C_{dl}}$. The resistor 234 has a resistance of $R_{dl}$ with a current thereover of $i_{dl}$.

Generally, in operation, a user indicates a type of energy storage device or combination of energy storage devices that are to be emulated through utilization of the emulator circuitry 114 and the control systems 120. The control systems 120 are configured to control the switches in the inverter 214 and the switches 226 in the bus connection 218 to emulate operation of the selected energy storage device or combination of devices.

Pursuant to an example, when the emulator circuitry 114 is emulating a charging state of the desired energy storage device and is, thereby, drawing current from the DC bus, the switches of the inverter 214 and the switches 226 of the output filter 218 configured to direct the current to the dump load 228, wherein dumps power via the resistor 234. From the perspective of the microgrid 102, the emulator apparatus 100 is drawing power from the energy bus 108. The microprocessor 116 can be configured to track an amount of power drawn from the DC bus. When the emulator circuitry 114 is to emulate the energy storage device discharging power to the energy bus 108, the switches of the inverter 214 and the inverter 226 of the output filter 218 are operated to cause current generated at the power source 202 to be converted to DC current, which is then delivered to the energy bus 108. The dump load 228 is employed to dump any excess energy generated by the voltage source 202. Again, from the perspective of the microgrid 102, the emulator apparatus 100 is acting as an energy storage device that is discharging energy to the energy bus 108.

As disclosed above, control algorithms and circuit elements in the emulator circuitry 114 can be selected to allow for emulation of a variety of different types of energy storage devices with different operating characteristics. Capacitors can be selected to emulate relatively fast transitions between states, as well as to emulate relatively high charging and discharging states. Depending upon energy storage devices that are desirably emulated, however, it is to be understood that other circuit elements can be included in the emulator circuitry 114.

Further, as noted above, the emulator circuitry 114 can be configured to emulate a collection of energy storage devices or theoretical energy storage devices. For instance the emulator apparatus 100, through utilization of the emulator circuitry 114, can be configured to emulate an energy storage system composed of a first type of energy storage device that is in parallel with a second type of energy storage device. Operation of the microgrid 102 can then be monitored running various experiments with the emulator apparatus 100 acting or emulating different energy storage devices or combinations of energy storage devices.

In an exemplary embodiment, utilizing the emulator circuitry 114 shown in FIG. 2, and with circuit elements having values denoted below in Table 1, the emulator apparatus 100 can emulate ±5 kW (±12.5 A) at 400 volts DC. Moreover, 600 Hz closed-loop bandwidth control is enabled both when the emulator apparatus 100 is acting as a source and a sink.

TABLE 1

| CIRCUIT ELEMENT | VALUE |
| --- | --- |
| $L_b$ | 2 mH/18 A |
| $L_{dl}$, $L_s$ | 1 mH/18 A |
| $C_b$ | 750 μF/500 V |
| $R_b$ | 0.35 Ω/60 W |
| $C_{dl}$ | 1000 μF/800 V |
| $C_{link}$ | 3300 μF/1200 V |
| $R_{dl}$ | 60 Ω/5 kW |

It is to be understood that the emulator circuitry 114 can be modified in various manners, and that the emulator circuitry 114 as shown in FIG. 2 is not intended to be limiting.

Figure 2A:
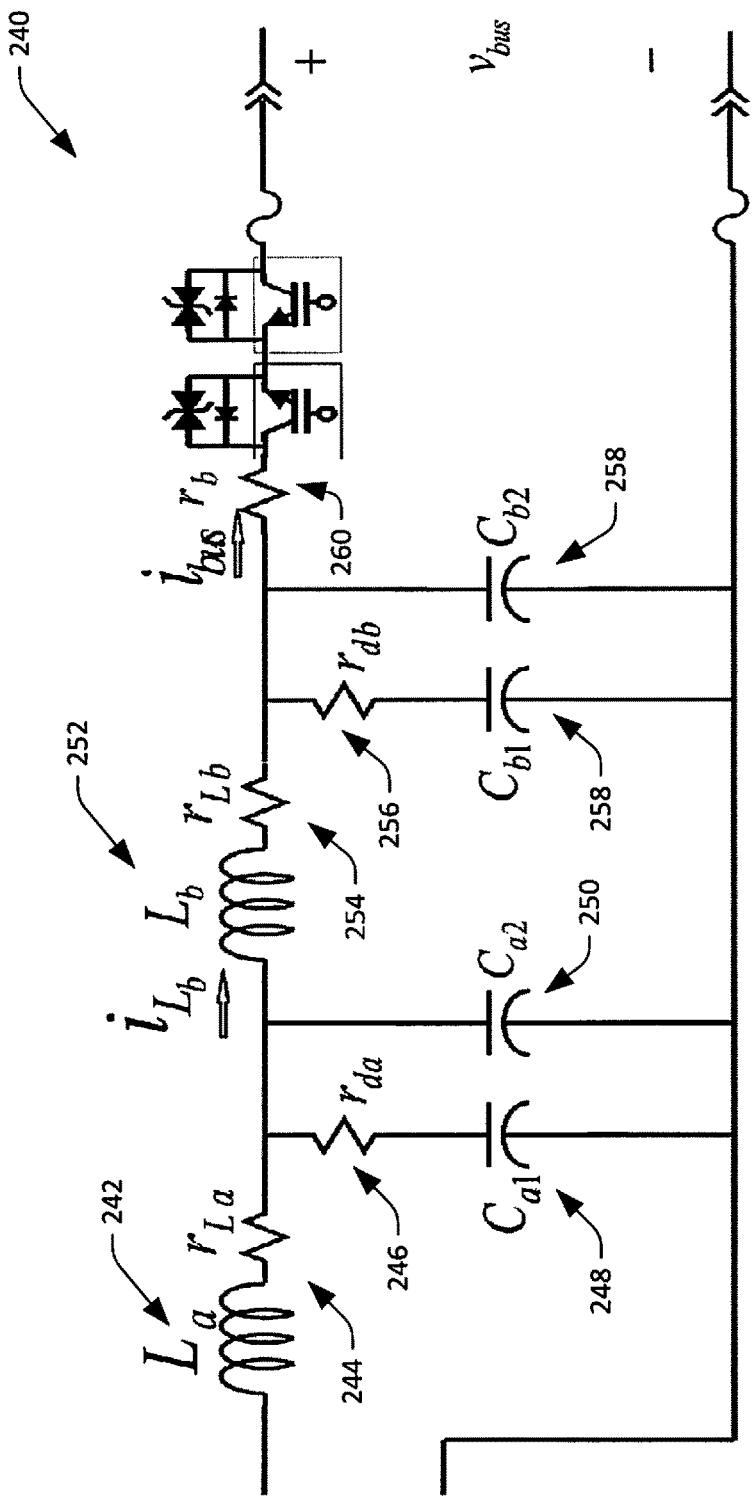
FIG. 2A illustrates an exemplary output filter.

Turning briefly to FIG. 2A, another exemplary output filter 240 (e.g., that can be employed to replace the output filter 218 shown in FIG. 2) is illustrated. The output filter 240 includes an inductor 242 with inductance $L_a$ in series with a resistor 244 with resistance $r_{La}$. Such circuit elements are in electric connection with a resistor 246 with resistance $r_{da}$ and a capacitor 248 with capacitance $C_{a1}$, which are electrically connected in parallel to a capacitor 250 with capacitance $C_{a2}$. An inductor 252 with inductance $L_b$ and a resistor 254 with resistance $R_{Lb}$ are in electric connection with the inductor 242 and the resistor 244, the capacitor 248 and the resistor 246, and the capacitor 250. A resistor 256 with resistance $r_{db}$ is coupled in series with a capacitor 258 with capacitance $C_{b1}$, and are electrically connected to series-connected inductor 252 and resistor 254. A capacitor 260 with capacitance $C_{b2}$ is in parallel with the series-connected resistor 256 and capacitor 258. The output filter 240 additionally includes a resistor 262 with resistance $r_b$, as well as the switches 226, which operate as described above. Current through the inductor 252 is denoted as $i_{L_b}$, and current over the resistor 260 is denoted as $i_{bus}$.

Exemplary values for the circuit elements in the output filter 240 are set for the below in Table 2. It is to be understood that other configurations for an output filter are contemplated. Additionally, the resistors 244, 254, and 260 can be parasitic, such that they may not be discrete circuit elements.

TABLE 2

| CIRCUIT ELEMENT | VALUE |
| --- | --- |
| $L_a$ | 494 mH |
| $r_{La}$ | 18 mΩ |
| $r_{da}$ | 10 Ω |
| $C_{a1}$ | 30 μF |
| $C_{a2}$ | 10 μF |
| $L_b$ | 494 mH |
| $r_{Lb}$ | 18 mΩ |
| $r_{db}$ | 10 Ω |
| $C_{b1}$ | 30 μF |
| $C_{b2}$ | 10 μF |
| $r_b$ | 0.05 Ω |

Figure 3:
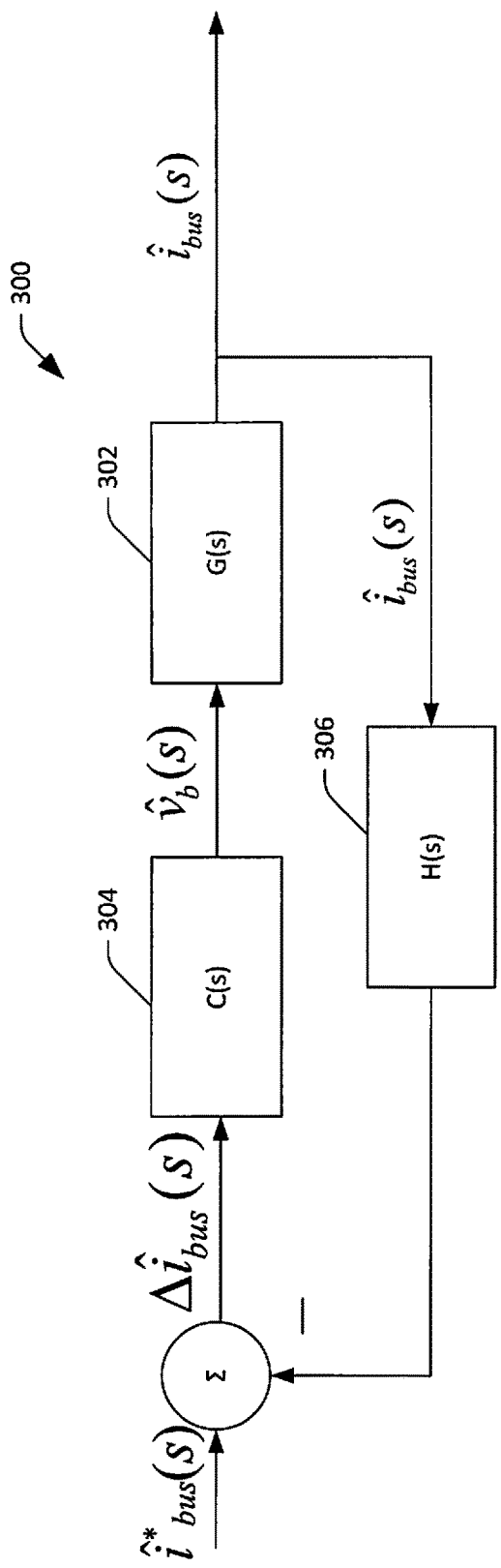
FIG. 3 illustrates a control diagram usable in connection with the emulator circuitry shown in FIG. 2.

With reference now to FIG. 3, an exemplary control system diagram 300 that represents a high level overview of the control systems 120 that can be employed to control the emulator circuitry 114 when configured as shown in FIG. 2 is illustrated. A system transfer function G(s) 302 generates an output $\hat{i}_{bus}(s)$ that is indicative of a desired value of current delivered to or retrieved from the energy bus 108. A filter transfer function H(s) 304 receives such output. For $v_{dc}$ being relatively constant, the output filter is excited as follows:

$$\hat{v}_b(t) = \frac{v_{dc}}{T_s} \int_{t-T_s}^{t} S_b d\tau.$$

output of the filter transfer function 304 is subtracted from a reference (desired) current $\hat{i}^*_{bus}(s)$, and a control system transfer function 306 receives $\Delta \hat{i}_{bus}(s)$. The control system transfer function computes $\hat{v}_b(s)$ as a function of $\Delta \hat{i}_{bus}(s)$, which is provided to the system transfer function G(s) 302.

In connection with the emulator circuitry 114 shown in FIG. 2, the G(s) can be defined as follows:

$$G(s) = \frac{\hat{i}_{bus}(s)}{\hat{v}_b(s)} = \frac{\frac{1}{L_b C_b R_{b0}}}{s^2 + \frac{1}{C_b R_{b0}}s + \frac{1}{L_b C_b}}.$$

Further, the following can hold true:

$$\frac{\hat{i}_{bus}(s)}{\hat{i}^*_{bus}(s)} = \frac{G(s)C(s)}{(1 + G(s)C(s)H(s))}$$

In another exemplary embodiment, hysteresis current control can be employed when emulating an energy storage device. Specifically, for $2v_{bus}$ and $$f_{sw} = 20 \text{ kHz}, h = \frac{v_{bus}}{4L_b f_{sw}} = 2.5 \text{ A}.$$

In such an embodiment, G(s) can be defined as follows:

$$G(s) = \frac{\hat{i}_{bus}(s)}{\hat{i}_b(s)} = \frac{1}{c_b R_b s + 1}.$$

Now referring to FIG. 4, schematic diagrams of respective circuits 400 and 402 illustrating a technique for emulating inductance are shown. The circuit 400 includes a circuit element 404 with desired impedance $\tilde{Z}_{xs,eq}$ that is to be emulated when a voltage source 406 with voltage $\hat{V}_{xs}$ drives a current $\hat{I}_{xs}$ through the circuit element 404. The circuit 402 includes the voltage source 406; however, the circuit 402 also includes a circuit element 408 with a different impedance; $\tilde{Z}_{xs,act}$. By inserting a controlled voltage source 410 that outputs voltage $\tilde{V}_{cont,xs}$, from the perspective of the voltage source 406, the impedance of circuit elements 408 and 410 is equivalent to the impedance of the circuit element 404. Further, it can be ascertained that the current $\hat{I}_{xs}$ is the same in both circuits if $$\tilde{v}_{cont,xs} = \left[1 - \frac{\tilde{Z}_{xs,act}}{\tilde{Z}_{xs,eq}}\right]\tilde{v}_{xs}.$$

Figure 5:
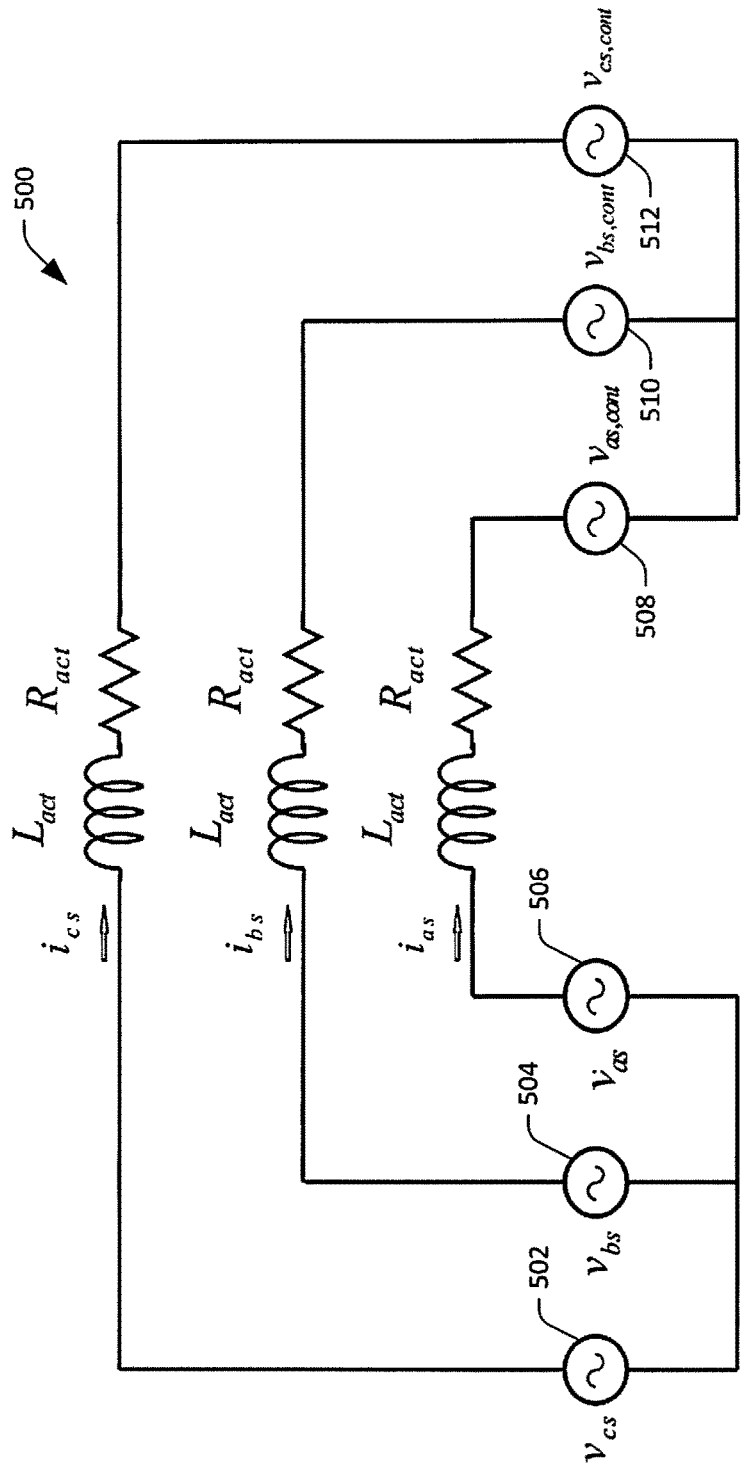
FIG. 5 is a schematic diagram that depicts positions in a three-phase bus where voltage can be controlled to emulate alterations in inductance.

Now referring to FIG. 5, a schematic diagram of a three-phase circuit 500 is illustrated. Each phase of the three-phase circuit has a respective voltage source 502, 504, and 506. Each leg also comprises a respective inductor and resistor. By inserting controlled voltage sources 508, 510, and 512 opposite the respective inductors and resistors from the voltage sources 502, 504, and 506, respectively, changes in resistance and inductance can be emulated (from the perspective of the voltage sources 502, 504, and 506). It can be ascertained that the current is the same in both circuits so long as the control voltage has a particular value.

Figure 6:
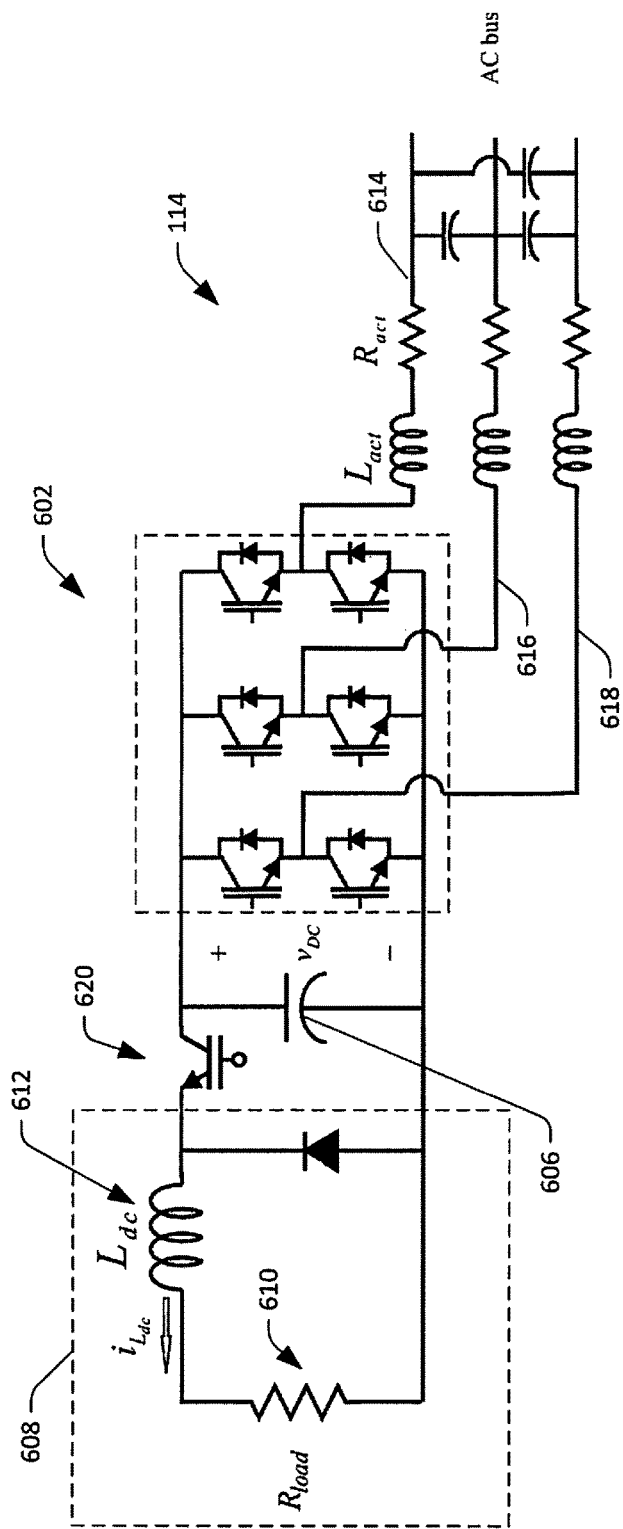
FIG. 6 is an exemplary schematic diagram of emulator circuitry that can be included in the emulator apparatus shown in FIG. 1.

With reference now to FIG. 6, a schematic diagram illustrating an exemplary implementation of the emulator circuitry 114 of the emulator apparatus 100 is illustrated. In such an embodiment, the emulator apparatus 100 is configured to emulate changes in resistance and inductance of a load connected to the microgrid 102. The emulator circuitry 114 includes an inverter 602 that comprises a plurality of switches. The inverter is coupled to a DC link that comprises a capacitor 606 with a relatively high capacitance. For example, the capacitor 506 can have a capacitance on the order of 2-5 mF, and a voltage thereover is denoted as $v_{DC}$. The DC link has three phase legs for the inverter 602, and a switch 620 for a dump load 608. The dump load 608 includes a resistor 610 with a resistance of $R_{load}$. The dump load 608 also includes an inductor 612 connected in series with the resistor 610, wherein inductance of the inductor is denoted as $L_{dc}$, and current through the inductor is $i_{L_{dc}}$.

Each of three phases 614, 616 and 618 of the inverter 602 comprises a respective inductor and a respective resistor, wherein inductance of the inductors is relatively nominal, and is denoted as $L_{act}$. A value for $L_{act}$ can be selected based upon, for instance, sensitivity of voltage sensors that are configured to sense voltages of the inverter 602. In an exemplary embodiment, $L_{act}$ can be between 1 mH and 8 mH. The resistors on the three phases can have a resistance of $R_{act}$. The emulator circuitry 114 further comprises three filter capacitors with capacitance denoted as $C_{filt}$.

Exemplary values for components of the emulator circuitry 114, as shown in FIG. 6, are set forth below in Table 2. Such values are not intended to be limiting as to the scope of the claims.

TABLE 2

| COMPONENT | VALUE |
|---|---|
| $L_{act}$ | 4 mH/18 A |
| $R_{act}$ | 0.20 Ω/60 W |

TABLE 2-continued

| COMPONENT | VALUE |
|---|---|
| $C_{dl}$ | 1000 μF/800 V |
| $C_{link}$ | 3300 μF/1200 V |
| $L_{dc}$ | 2 mH/18 A |
| $R_{load}$ | 60 Ω/5 kW |
| $C_{filt}$ | 35 μF/370 VAC |

Two control systems can be employed to control operation of the emulator circuitry 114 as shown in FIG. 6: a first control system that commands inverter voltages such that phase currents and their respective dynamics match that of a system with specified impedance/resistance; and a second control system can be configured to control a buck converter 620 to cause power to be transmitted to the dump load 608 when the emulator apparatus 100 has excess stored energy.

In other words, by controlling voltages of the inverter 602 (and monitoring such voltages through utilization of voltage sensors), from the perspective of the microgrid 102, resistance and inductance of the emulator apparatus 100 can be much greater than the actual resistance and inductance in the phases 614-618. Likewise, controlling the buck converter 620 to allow power to be dissipated through the dump load 608 allows the emulator apparatus 100 to dissipate energy that would have been dissipated by a greater resistance than exists on the phases 614-618. Emulating various resistances and inductances through utilization of relatively small resistors and inductors causes the emulator apparatus 100 to be relatively lightweight—e.g., less than 100 pounds. Thus, the emulator apparatus 100 can emulate resistances and inductances that would otherwise require several hundred pound inductors to be coupled to the AC bus of the microgrid 102. Furthermore, as noted above, inverter voltages can be selectively altered to cause the emulator apparatus 100 emulate step changes in resistances and inductance. Therefore, a profile of step changes in resistance and inductance can be emulated and the response of the microgrid 102 can be monitored for microgrid design/testing purposes.

The emulator apparatus 100 can be used in a variety of applications. For example, the emulator apparatus 100 can be employed in research and development settings for testing control applications of the microgrid 102. Further, the emulator apparatus 100 can be programmed with a load profile (which includes step changes in inductance and/or resistance) to test the operation of a relatively newly installed microgrid. Still further the emulator apparatus 100 can be programmed to test particular components of a microgrid. For instance, solar inverters must be tested prior to being deployed. The emulator apparatus 100 can be employed in connection with testing such an inverter. Other applications will be readily ascertained.

Control of the emulator circuitry is now described. With respect to resistance-inductance type loads, actual impedance can be defined as $Z_{s.act} = R_{act} j\omega L_{act}$, and impedance that is desirably emulated can be defined as $Z_{s.eq} = R_{eq} + j\omega L_{eq}$. In the time domain, $$\rho i_{xs} = \frac{1}{L_{act}}(v_{xs} - v_{cont,xs}) - \frac{R_{act}}{L_{act}}i_{xs} \equiv \rho i_{xs} = \frac{1}{L_{eq}}(v_{sx}) - \frac{R_{eq}}{L_{eq}}i_{xs}.$$

The control voltage thus, in an exemplary embodiment, can become $$v_{cont,xs} = \left(1 - \frac{L_{act}}{L_{eq}}\right)v_{xs} - \left(1 - \frac{R_{eq}L_{act}}{R_{act}L_{eq}}\right)R_{act}i_{xs}.$$

Such control voltage can be maintained using, for instance, switch modulation.

The buck converter 620 can be controlled through utilization of hysteresis current control with commanded current:

$$i^*_{buck} = \sqrt{\frac{R_{eq} - R_{act}}{R_{load}}} \cdot \sqrt{(i^2_{as} + i^2_{bs} + i^2_{cs})}.$$

The above ensures that the emulator circuitry 114 consumes as much power as an R-L load with resistance $R_{eq}$.

While FIG. 6 illustrates an exemplary configuration of circuit elements to emulate an R-L load, it is to be understood that other load types that allow for emulation of time-varying impedance are contemplated and are intended to fall under the scope of the hereto-appended claims. Pursuant to an example, a parallel R-L-C load can be emulated utilizing techniques similar to those described above.

Figure 7:
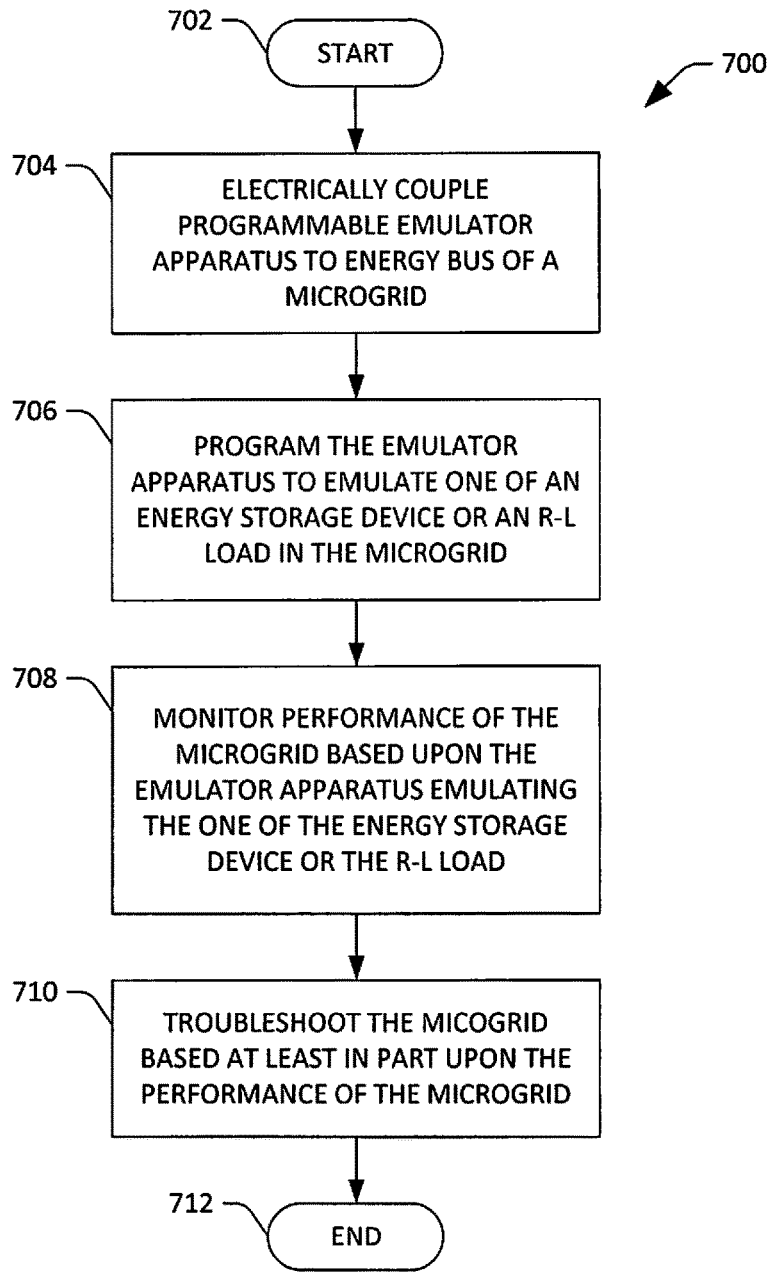
FIG. 7 is a flow diagram that illustrates an exemplary methodology for troubleshooting a microgrid through utilization of an emulator apparatus.
Figure 8:
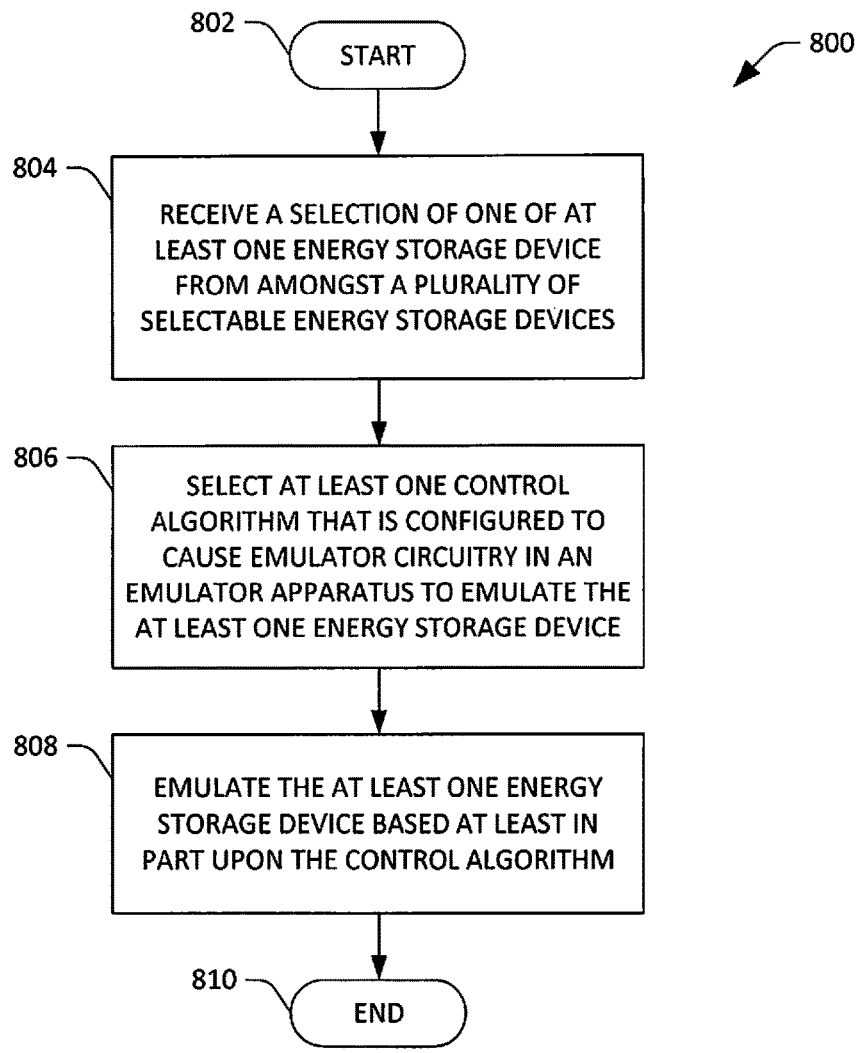
FIG. 8 is a flow diagram that illustrates an exemplary methodology for emulating an energy storage device that can be coupled to a microgrid.
Figure 9:
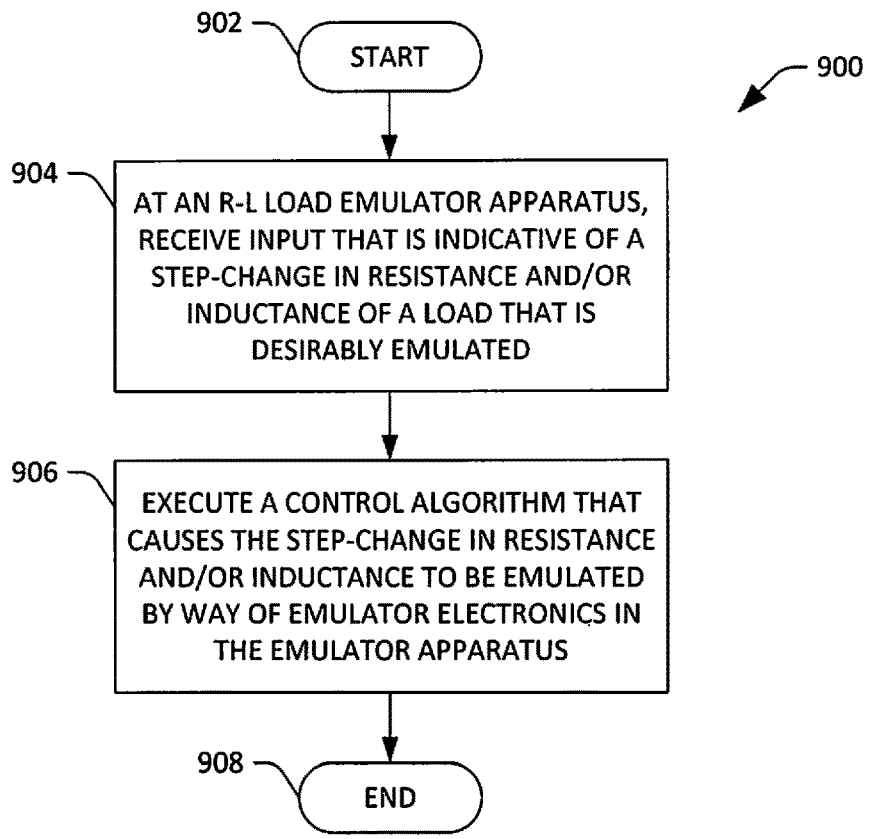
FIG. 9 is a flow diagram that illustrates an exemplary methodology for emulating step changes in load resistance or inductance in a microgrid.

With reference now to FIGS. 7-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring solely to FIG. 7, an exemplary methodology 700 for troubleshooting a microgrid is illustrated. The methodology 700 starts at 702, and at 704 a programmable emulator apparatus is electrically coupled to an energy bus of a microgrid. At 706, the emulator apparatus is programmed to emulate one of an energy storage device or an adaptive R-L load in the microgrid. At 708, performance of the microgrid is monitored based upon the emulator apparatus that is emulating the one of the energy storage device or the R-L load.

At 710, or troubleshooting is performed with respect to the microgrid based at least in part upon the performance of the microgrid when the emulator apparatus is emulating the one of the energy storage device or the R-L load. The methodology 700 completes at 712.

With reference now to FIG. 8, an exemplary methodology 800 that facilitates emulating at least one energy storage device is illustrated. The methodology 800 starts at 802, and at 804 a selection of one of at least one energy storage device from amongst a plurality of selectable energy storage devices is received. In other embodiments, selection of a combination of energy storage devices can be received.

At 806, at least one control algorithm that is configured to cause emulator circuitry in an emulator apparatus to emulate the at least one energy storage devices is selected. For example, emulator circuitry in the emulator apparatus can be controlled differently when different energy storage devices are selected or different combinations of energy storage devices are selected.

At 808, the at least one energy storage device is emulated based at least in part upon the control algorithms selected at 806. The methodology 800 completes at 810.

With reference now to FIG. 9, an exemplary methodology 900 for emulating a step-change in resistance or inductance for a load in a microgrid is illustrated. The methodology 900 starts at 902, and at 904, at an R-L load emulator apparatus, input is received that is indicative of a step change in resistance or inductance of a load that is desirably emulated.

At 906, a control algorithm is executed that causes the step change in resistance or inductance to be emulated by way of emulator circuitry in the emulator apparatus. The methodology 900 completes at 908.

Figure 10:
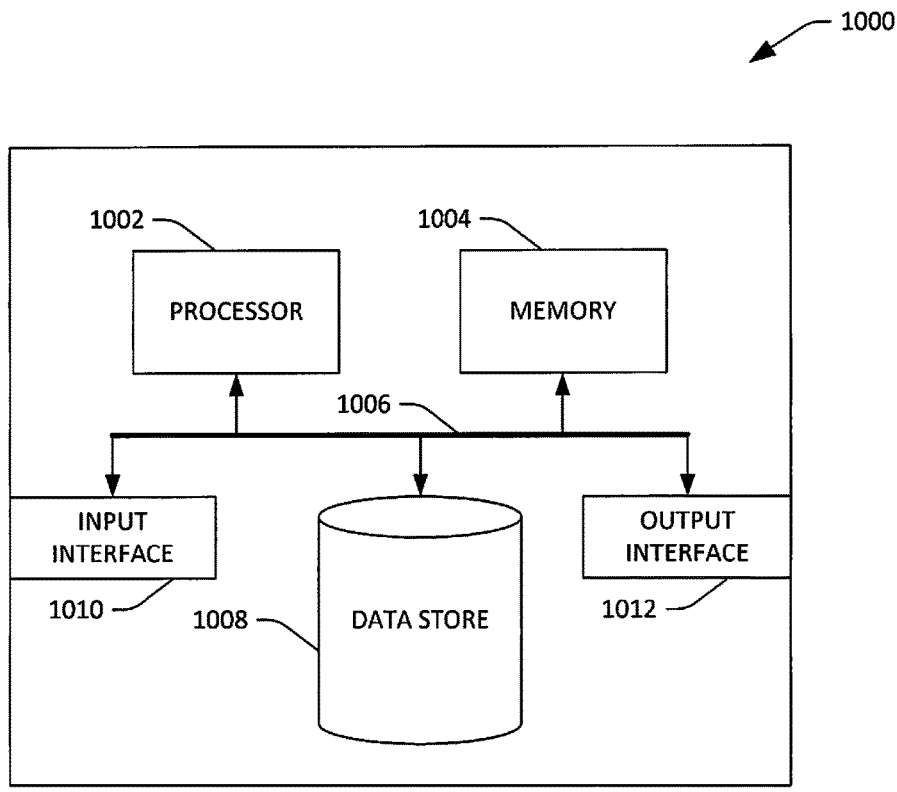
FIG. 10 is an exemplary computing device.

Now referring to FIG. 10, a high-level illustration of an exemplary computing device 1000 that can be used in accordance with the systems and methodologies disclosed herein is illustrated. For instance, the computing device 1000 may be used in a system that supports emulating an energy storage device. In another example, at least a portion of the computing device 1000 may be used in a system that supports emulating a load with time-varying resistance and/or inductance. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store control algorithms, sensor signals, and the like.

The computing device 1000 additionally includes a data store 1008 that is accessible by the processor 1002 by way of the system bus 1006. The data store 1008 may be or include any suitable computer-readable storage, including a hard disk, memory, etc. The data store 1008 may include executable instructions, control algorithms, etc. The computing device 1000 also includes an input interface 1010 that allows external devices to communicate with the computing device 1000. For instance, the input interface 1010 may be used to receive instructions from an external computer device, a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An emulator apparatus, consisting essentially of:
   emulator circuitry consisting essentially of:
   a plurality of switches:
   a three-phase inverter comprising a first phase leg, a second phase leg, and a third phase leg, each of the first phase leg, the second phase leg, and third phase leg having a respective inductor and a respective resistor;
   a DC link coupled to an output of the inverter;
   a buck converter electrically connected to the DC link; and
   a dump circuit, the buck converter controlled to direct current to the dump circuit;
   an interface that receives program instructions, the program instructions indicating a desirable alteration in resistance and inductance of the emulator circuitry to a predetermined resistance and inductance for emulating a desirable variable load of a microgrid;
   wherein the emulator circuitry emulates the desirable variable load of the microgrid;
   wherein the emulator circuitry alters the resistance and the inductance to the predetermined resistance and inductance to emulate the desirable variable load responsive to the interface receiving the program instructions, with the plurality of switches which are selectively activated as a function of the program instructions to cause the emulator circuitry to emulate the desirable alteration in resistance and inductance in accordance with the program instructions; and
   wherein the emulator circuitry alters current of the emulator circuitry that emulates resistance and the inductance of a load through feedback control of the current such that a predetermined controlled current-to-voltage relationship is established that emulates the desirable resistance and inductance.

2. The emulator apparatus of claim 1 having a weight of less than one hundred pounds.

3. The emulator apparatus of claim 1, wherein the program instructions comprise an inductance profile that defines step-changes in inductance to be consumed by the load emulator apparatus.

4. The emulator apparatus of claim 1, wherein the emulator circuitry simultaneously alters the resistance and the inductance.

5. The emulator apparatus of claim 1, wherein the microgrid comprises an AC voltage bus, and wherein the emulator apparatus consumes energy from the AC voltage bus.

6. The emulator apparatus of claim 1, wherein the variable load is a three phase load.

7. The emulator apparatus of claim 1, wherein the DC link comprises a capacitor, and wherein the capacitor has a capacitance of between 2 mF and 5 mF.

8. The emulator apparatus of claim 1, wherein each inductor on the first phase leg, the second phase leg, and the third phase leg has a respective inductance of between 1 mH and 8 mH.

* * * * *